(12) United States Patent
Rea et al.

(10) Patent No.: US 6,720,050 B2
(45) Date of Patent: Apr. 13, 2004

(54) RADIATION-CURED, LAMINATED FLEXIBLE PACKAGING MATERIAL

(75) Inventors: Kevin D. Rea, Wauwatosa, WI (US); Stephen C. Lapin, Waterford, WI (US)

(73) Assignee: Northwest Coatings Corporation, Oak Creek, WI (US)

(*) Notice: Subject to any disclaimer, the term of this patent is extended or adjusted under 35 U.S.C. 154(b) by 0 days.

(21) Appl. No.: 10/253,810

(22) Filed: Sep. 25, 2002

(65) Prior Publication Data

US 2003/0031865 A1 Feb. 13, 2003

Related U.S. Application Data

(62) Division of application No. 09/348,662, filed on Jul. 6, 1999, now Pat. No. 6,472,056.

(51) Int. Cl.$^7$ .......................... B32B 27/08; B32B 27/10; B32B 29/06
(52) U.S. Cl. ............... 428/35.7; 428/34.2; 428/345; 428/483; 428/514; 428/520
(58) Field of Search ................. 428/34.2, 35.7, 428/345, 483, 514, 520

(56) References Cited

U.S. PATENT DOCUMENTS

| | | |
|---|---|---|
| 3,810,825 A | 5/1974 | Mani |
| 4,389,472 A | 6/1983 | Neuhaus et al. |
| 4,533,723 A | 8/1985 | Weitemeyer |
| 4,643,730 A | 2/1987 | Chen et al. |
| 4,704,310 A | 11/1987 | Tighe et al. |
| 4,767,654 A | 8/1988 | Riggsbee |
| 5,166,226 A | * 11/1992 | Rice et al. |
| 5,202,361 A | 4/1993 | Zimmerman et al. |
| 5,262,216 A | 11/1993 | Popat et al. |
| 5,284,688 A | 2/1994 | Hiatt |
| 5,286,128 A | 2/1994 | Gillum |
| 5,385,772 A | 1/1995 | Slovinsky et al. |
| 5,399,396 A | 3/1995 | Ohlsson et al. |
| 5,672,224 A | 9/1997 | Kaufmann |
| 5,830,571 A | 11/1998 | Mann et al. |
| 5,861,201 A | 1/1999 | Blackwelder et al. |
| 5,874,143 A | 2/1999 | Peloquin et al. |
| 5,912,381 A | 6/1999 | Narayan et al. |

FOREIGN PATENT DOCUMENTS

| | | |
|---|---|---|
| JP | 54093026 | 7/1979 |
| JP | 58108280 | 6/1983 |

OTHER PUBLICATIONS

Trakhtenberg, "Factors Affecting Bond Strengths of UV Curable Laminating Adhesives", Northwest Coatings Corp., 1998, Oak Creek, Wisconsin, RadTech 98.

* cited by examiner

*Primary Examiner*—Sandra M. Nolan
(74) *Attorney, Agent, or Firm*—Jeffrey S. Melcher; Manelli Denison & Selter, PLLC

(57) ABSTRACT

Provided is a laminate label adapted for use on plastic containers suitable for containing a pharmaceutical or food grade product. The laminate label includes a substantially clear or translucent protective polymeric layer bound to a face stock by a radiation-cured adhesive composition formulated from a low-migration, radiation-curable adhesive composition containing at least 50% of one or more radiation-curable, carboxylic acid functional monomers.

24 Claims, 2 Drawing Sheets

RADIATION-CURED, LAMINATED FLEXIBLE PACKAGING MATERIAL

This application is a divisional of U.S. Ser. No. 09/348,662, filed on Jul. 6, 1999, now U.S. Pat. No. 6,472,056, the complete disclosure of which is incorporated herein by reference.

FIELD OF THE INVENTION

The invention relates to a radiation-cured, laminate label. The invention also relates to the radiation-cured, laminate label bound to a polyolefin-based plastic container. The invention further relates to a radiation-cured, flexible laminate packaging material. The invention also relates to a radiation-curable adhesive composition suitable for use in forming the laminate label and flexible laminate packaging material.

BACKGROUND OF THE INVENTION

Label applications typically require the protection afforded by an overlaminate of clear film, such as laminate labels which are subjected to an excessive amount of abrasion or moisture. Specific examples include labels for water, milk and other beverage grade containers, as well as labels for food grade and pharmaceutical grade containers, that are subjected to moist environments, such as condensation caused by repeated trips into and out of refrigerators.

The laminate labels usually comprise an outer clear protective film bound to a face stock using a radiation-cured laminating adhesive. The protective film is usually formed from a polyolefin, such as polypropylene, but can also be formed from other suitable polymeric materials, such as polystyrenes or polyesters. A pressure sensitive adhesive is usually applied to the back of the face stock for bonding the laminate label to a container.

It has recently been found that when the radiation-curable laminating adhesive is applied to the face stock, radiation-curable monomers adsorb into the face stock. The face stock hinders or prevents curing of the monomers adsorbed therein and thus, the adsorbed monomers are not bound. Over time, these unbound monomers can undesirably migrate through the face stock, pressure sensitive adhesive layer, and through the polyolefin container to contaminate the contents of the container. This problem is especially prevalent in extended shelf life items, such as beverage and pharmaceutical containers. The radiation-curable monomers can cause an undesirable odor and/or taste in the container contents.

There is a need for a radiation-cured, laminate label which does not leach monomers into the contents of polyolefin containers.

A similar problem also exists in flexible laminate packaging materials which contain a polyolefin layer and use a radiation-curable adhesive to bond the layers together. Uncured radiation-curable monomers can migrate through the polyolefin layer in the same manner as polyolefin containers and undesirably contaminate the contents thereof. Thus, there is a need for a radiation-cured, flexible laminate packaging material which does not leach monomers into the contents thereof.

SUMMARY OF THE INVENTION

An objective of the invention is to provide a radiation-cured, laminate label which does not leach radiation-curable monomers into the contents of polyolefin containers.

Another objective of the invention is to provide a radiation-cured, flexible laminate packaging material which does not leach radiation-curable monomers into the contents thereof.

The above objectives and other objectives are surprisingly obtained by using a low-migration, radiation-curable adhesive composition formulated from carboxylic acid functional monomers.

The invention provides a novel laminate label adapted for use on plastic containers suitable for containing a pharmaceutical or food grade product. The laminate label comprises a substantially clear or translucent protective polymeric layer bound to a face stock by a radiation-cured adhesive composition formulated from a low-migration, radiation-curable adhesive composition comprising at least 50% of one or more radiation-curable, carboxylic acid functional monomers.

The invention also provides a novel labeled plastic container suitable for containing a pharmaceutical or food grade product comprising:

a walled structure comprising a polyolefin material defining an interior space suitable for containing a liquid or solid food product or pharmaceutical product; and a laminate label bound to an outer surface of said walled structure. The laminate label comprises a substantially clear or translucent protective polymeric film bound to a face stock by a radiation-cured composition formulated from a low-migration, radiation-curable adhesive composition comprising at least 50% of one or more radiation-curable, carboxylic acid functional monomers.

The invention further provides a novel laminated flexible packaging material suitable for containing a pharmaceutical or food grade product comprising:

a polyolefin film defining an interior space suitable for containing a liquid or solid food product or pharmaceutical product; and at least one other film bound to the polyolefin film by a radiation-cured adhesive composition formulated from a radiation-curable composition comprising at least 50% of one or more radiation-curable, carboxylic acid functional monomers.

The invention also provides a novel low-migration, radiation-curable adhesive composition comprising at least 50% of one or more radiation-curable, carboxylic acid functional monomers.

DETAILED DESCRIPTION OF PREFERRED EMBODIMENTS

Low-Migration, Radiation-Curable Adhesive Composition

Figure 1:
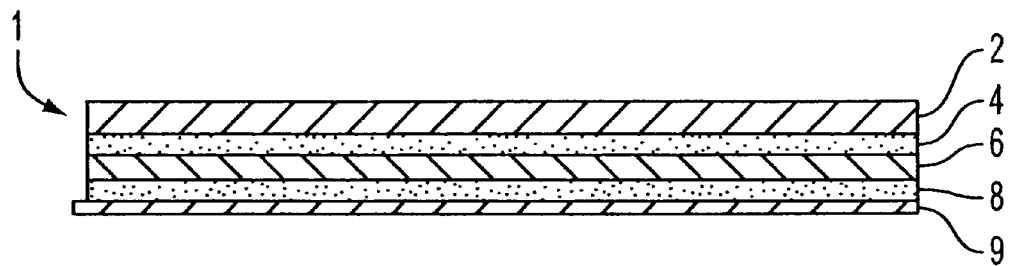
FIG. 1 illustrates a side, cross-sectional view of an improved laminate label according to the present invention.

The low-migration, radiation-curable adhesive composition (hereinafter referred to as "radiation-curable adhesive composition") comprises at least 50 wt. % of one or more carboxylic acid functional, radiation-curable monomers (hereinafter referred to as "carboxylic acid functional monomer"). Preferably, the radiation-curable adhesive composition comprises at least 80 wt. % of one or more carboxylic acid functional monomers, and more preferably at least 90 wt. % of one or more carboxylic acid functional monomers. All wt. % are based on the total weight of the radiation-curable composition unless stated otherwise herein. While the radiation-curable composition may contain conventional non-carboxylic acid functional monomers if desired, preferably substantially all of the radiation-curable monomers present in the radiation-curable adhesive comprise at least one carboxylic acid functional group.

The carboxylic acid functional monomer preferably has a number average molecular weight of from about 100 to about 3000, more preferably from about 150 to about 2000, and most preferably from about 200 to about 1500. The simplest type of carboxylic acid functional monomer is acrylic acid. However, acrylic acid is not desirable because of odor, toxicity and low molecular weight. Therefore, preferred radiation-curable adhesive compositions are substantially free of acrylic acid.

One skilled in the art will easily be able to form the desired carboxylic acid functional monomer based on well known reaction mechanisms. For example, using the well known reaction between a hydroxyl functional group and an anhydride, a compound containing both a hydroxyl functional group and a desired radiation-curable functional group can be reacted with an anhydride compound to form the desired carboxylic functional monomer. Suitable anhydrides include, but are not limited to:
phthalic anhydride;
isophthalic anhydride;
terephthalic anhydride;
trimellitic anhydride;
tetrahydrophthalic anhydride;
hexahydrophthalic anhydride;
tetrachlorophthalic anhydride;
adipic anhydride;
azelaic anhydride;
sebacic anhydride;
succinic anhydride;
glutaric anhydride;
malonic anhydride;
pimelic anhydride;
suberic anhydride;
2,2-dimethylsuccinic anhydride;
3,3-dimethylglutaric anhydride;
2,2-dimethylglutaric anhydride;
dodecenylsuccinic anhydride;
nadic methyl anhydride;
HET anhydride; and the like.

The compound containing a hydroxyl functional group and a radiation-curable functional group ("hydroxy functional, radiation-curable compound") can contain any desired radiation-curable functional group suitable for the desired application. The radiation-curable functional group preferably comprises ethylenic unsaturation. Examples of suitable ethylenic unsaturation include acrylate, methacrylate, styrene, vinylether, vinyl ester, N-substituted acrylamide, N-vinyl amide, maleate esters or fumarate esters. Preferably, the ethylenic unsaturation is provided by a group containing acrylate or methacrylate. Use of the term "(meth)acrylate" refers to either acrylate or methacrylate, or mixtures thereof.

Examples of suitable hydroxy functional, radiation-curable compounds containing (meth)acrylate groups include the following, but are not limited thereto:
2-hydroxyethyl (meth)acrylate;
2-hydroxypropyl (meth)acrylate;
2-hydroxybutyl (meth)acrylate;
2-hydroxy 3-phenyloxypropyl (meth)acrylate;
1,4-butanediol mono(meth)acrylate;
4-hydroxycyclohexyl (meth)acrylate;
1,6-hexanediol mono(meth)acrylate;
neopentylglycol mono(meth)acrylate;
trimethylolpropane di(meth)acrylate;
trimethylolethane di(meth)acrylate;
pentaerythritol tri(meth)acrylate;
dipentaerythritol penta(meth)acrylate; and
hydroxy functional (meth)acrylates represented by the following formula:

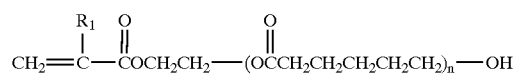

wherein $R_1$ is a hydrogen atom or a methyl group and n is an integer from 1 to 5. Commercially available examples include the hydroxy terminated (meth)acrylate prepolymers sold as "Tone" prepolymers (Union Carbide). The (meth) acrylate compounds can be used either alone or in admixture of two or more of them. Among these (meth)acrylate compounds, 2-hydroxyethyl (meth)acrylate and 2-hydroxypropyl (meth)acrylate are especially preferred. Examples of hydroxy functional, radiation-curable compounds having vinyl ether functional groups include, for example, 4-hydroxybutyl vinyl ether, and triethylene glycol monovinyl ether.

Preferably, the radiation-curable functional group is acrylate or methacrylate, with acrylate being the most preferred.

A particularly preferred carboxylic acid functional monomer is the product of the reaction of 2-hydroxyethylacrylate with succinic anhydride, as shown in the following formula:

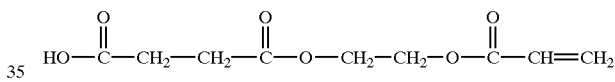

If desired, the carboxylic acid functional monomer can also be formed by reacting a suitable dicarboxylic acid functional compound with a hydroxy functional, radiation-curable compound. However, this method is not preferred since water is formed during the reaction of the hydroxyl group with a carboxylic acid group, which water must be removed prior to use of the carboxylic monomer in the radiation-curable adhesive composition.

Carboxylic acid functional monomers can also be formed by various combinations of polyanhydrides and/or polyols, as desired.

While not preferred, oligomeric forms of acrylic acid can also be used as the cabtoxylic acid functional monomer, which can be formed, for example, by dimerizing or trimerizing acrylic acid by well known self addition reactions. A stable dimer compound is betacarboxyethylacrylate ("BCEA"). However, BCEA is not preferred since it usually contains residual amounts of acrylic acid.

One skilled the art will easily be able to formulate the radiation-curable adhesive composition to provide a suitable viscosity for the desired application. Usually, the viscosity of the radiation-curable adhesive composition should be low, for example about 3000 centipoise or less, at the application temperature, to facilitate application to the face stock. Usually, the application temperature is room temperature (25° C.). However, higher application temperatures can be utilized as desired. The carboxylic acid functional monomer preferably has a low viscosity, in order to avoid the use of diluent monomers, to provide a viscosity that is suitable for application of the radiation-curable adhesive to the face stock. Suitable viscosities of the carboxylic functional monomer include from about 100 to about 2000 centipoise at the application temperature, more preferably from about 200 to about 700 centipoise at the application temperature.

When the radiation-curable adhesive is formulated for curing by exposure to visible light, ultraviolet light, or the like, one or more photoinitiators and/or photosensitizers can be used as polymerization initiators to enhance the cure speed. Examples of suitable photoinitiators and photosensitizers include:

2,2'-(2,5-thiophenediyl)bis(5-tert-butybenzoxazole);
1-hydroxycyclohexyl phenyl ketone;
2,2-dimethoxy-2-phenylacetophenone;
xanthone;
fluorenone;
anthraquinone;
3-methylacetophenone;
4-chlorobenzophenone;
4,4'-dimethoxybenzophenone;
4,4'-diaminobenzophenone;
Michler's ketone;
benzophenone;
benzoin propyl ether;
benzoin ethyl ether;
benzyl dimethyl ketal, 1-(4-isopropylphenyl)-2hydroxy-2-methylpropane-1-one;
2-hydroxy-2-methyl-1phenylpropane-1-one;
methylbenzoyl formate
thioxanthone;
diethylthioxanthone;
2-isopropylthioxanthone;
2-chlorothioxanthone;
2-methyl-1-(4-(methylthio)phenyl)-2-morpholinopropane-1-one; and 2,4,6-trimethylbenzoyldiphenylphosphine oxide. Commercially available examples include IRGACURE 184, 369, 500, 651, 819, 907, and 2959, and Darocur 1173 (Ciba Geigy); Lucirin TPO (BASF); and Ebecryl P36 and P37 (UCB Co.).

Preferably, polymeric photoinitiators are utilized in the radiation-curable adhesive composition. The use of polymeric photoinitiators further reduces the possibility of photoinitiator or fragments of the photoinititor migrating. Examples of suitable polymeric photoinitiators include, but are not limited to, the commercially available KIP 100 and KIP 150 (Lamberti).

If desired, one or more photoinitiators and/or photosensitizers can be incorporated in the radiation-curable adhesive coating composition in an amount of about 0.1 to about 10% by weight of the total composition.

If the radiation-curable adhesive composition is formulated to utilize a free-radical curing system by exposure to an electron beam, a photoinitiator is generally not beneficial. However, in cationically cured systems, a photoinitiator is beneficial even when performing an electron beam cure. Based on the disclosure provided herein, one skilled in the art of formulating radiation-curable adhesive compositions will easily be able formulate a suitable curing system for the desired application, without undue experimentation.

The radiation-curable adhesive can also include additives such as fillers, flow additives, anti-foaming additives, pigments, dyes, or resinous materials dispersed or solubilized in the composition. The selection and use of such additives is within the skill of the art.

The carboxylic acid functional monomers used in the present invention have been found to provide the unexpected combination of sufficient adhesion to low surface energy layers, such as polyolefin protective films, to avoid delamination and substantially avoid migrating through polyolefin containers in the uncured free monomer form.

The radiation-curable adhesive composition can be used to form improved laminate labels, as described below. The radiation-curable adhesive composition can also be used to form improved flexible laminate packaging materials, as described below.

Laminate Label and Polyolefin Container Having Laminate Label

Figure 2:
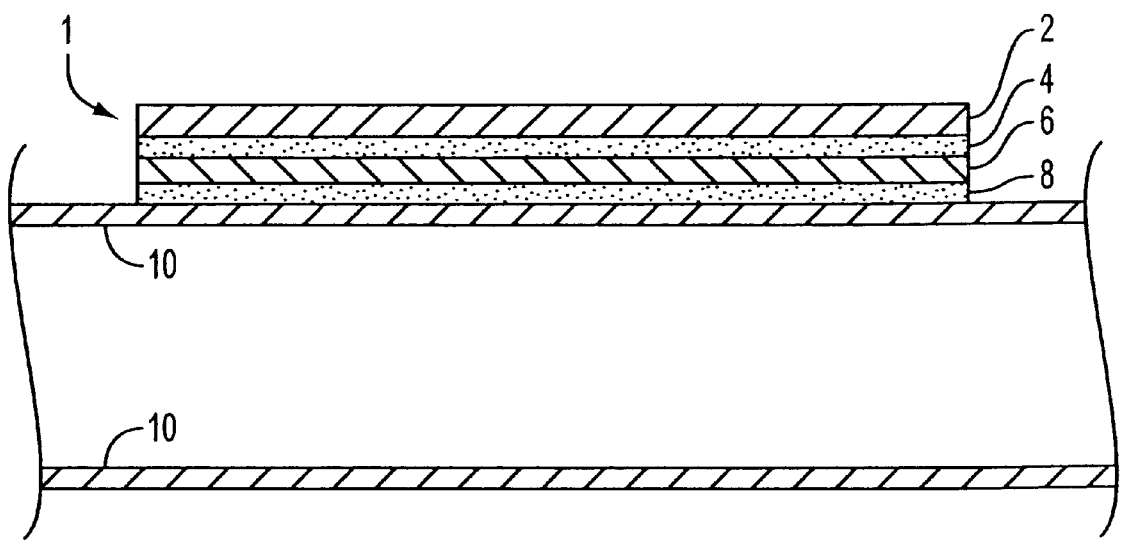
FIG. 2 illustrates a side, cross-sectional view of a polyolefin container suitable for containing a pharmaceutical or food product having the improved laminate label bonded on an outer surface thereof.

The present invention will now be described with reference to the attached drawings. As shown in FIG. 1, the laminate label 1 includes a substantially clear or translucent protective polymer layer 2, which is bound to a face stock 6 using the radiation-curable adhesive composition described herein 4. An optional pressure sensitive adhesive layer 8 is shown on the back of the face stock 6 opposing the protective polymer layer 2. The laminate label can also include other layers as desired and commonly used in the art, such as a release liner 9. The release liner 9 should be removed from the label 1 prior to application. The face stock can include printed material formed by well known methods. FIG. 2 illustrates the laminate label 1 bonded to a polyolefin container 10 by the pressure sensitive adhesive 8.

It has been found that radiation-curable monomers usually adsorb into the face stock 6 when applied thereon. The face stock 6 hinders or prevents curing of the monomers adsorbed therein and thus, the adsorbed monomers are not bound in the formed laminate label. Over time, these unbound monomers can migrate through the face stock 6 and pressure sensitive adhesive 8 to reach the polyolefin container 10. The monomers have also been found to undesirably migrate through the polyolefin container 10 and contaminate the contents thereof. The monomers can cause an undesirable odor and/or taste in the container contents.

The radiation-curable adhesive composition according to the present invention, is formulated from low-migration, carboxylic acid monomers. It has been found that the carboxylic acid monomers migrate through polyolefin containers in significantly less amounts than conventionally used monomers in conventional laminate labels.

It has also been found that the carboxylic acid monomers used in the present invention provide the unexpected combination of providing sufficient adhesion to low surface energy layers when suitably cured, such as polyolefin protective films, to avoid delamination and they substantially avoid migrating through the walls of polyolefin container 10 when in the free uncured monomer form.

The substantially clear protective polymeric layer 2 can be formed from any suitable polymeric material. Examples of suitable polymeric materials include polyolefins, polyesters and polystyrenes. Preferably, the protective polymeric layer is formed from a polyolefin. Examples of suitable polyolefins include, but are not limited to, homopolymers or copolymers of ethylene, butylene, propylene, hexene, octene, etc. Preferred polyolefins include polypropylene and polyethylene, such as high-density polyethylene (HDPE) or linear-low-density polyethylene (LLDPE), polyiosbutylene (PIB). Polypropylene is especially preferred. Oriented forms of polypropylene can be used as desired, such as biaxially oriented (BOPP) or oriented polypropylene (OPP). When using ultra-violet (UV) light to cure the radiation-curable adhesive composition, a polymeric material should be selected which does not prevent or substantially inhibit curing of the radiation-curable adhesive by absorbing or shielding the UV light. However, when electron beam curing is used, the polymeric material selected can be substantially more opaque than when UV curing. The protective polymeric layer 2 is usually about 0.2 to about 2 mils thick, preferably about 0.4 to about 1.5 mils.

Face stocks are well known in the label art. The face stock usually contains printed material in form of ink and/or from electrophotographic techniques. Any suitable face stock can be utilized in the present invention. While bleached kraft paper is the most often used face stock material for labels, the face stock can be formed from synthetic polymeric materials, such as polyolefins, polyesters and polyvinylchlorides, if desired. The face stock can also be formed from combinations of synthetic and plant fibers, in woven or non-woven forms. The present invention is especially useful for face stocks which are capable of adsorbing radiation-curable monomers, such as fibrous materials formed from synthetic and/or plant fibers, or porous polymeric films. Suitable face stocks are disclosed in U.S. Pat. Nos. 5,284,688 and 5,830,571, which are incorporated herein by reference.

Once the printed material is formed on the face stock, the protective polymeric layer and radiation-curable adhesive composition can be applied to the face stock using well known techniques. A preferred method includes use of a flexographic printing press to print the face stock and apply the radiation-curable adhesive in line. The radiation-curable adhesive composition can be cured by well known methods, such as by UV light from medium pressure mercury lamps or low intensity fluorescent lamps directly through the protective polymeric layer. Alternatively, electron beam radiation may be used to cure the radiation-curable adhesive composition. The laminate label can be formed using the UV curing methods described in U.S. Pat. Nos. 5,262,216 and 5,284,688, if desired.

Pressure sensitive adhesives are now well known in the label art. Any suitable pressure sensitive adhesive can used on the laminate label according to the present invention. U.S. Pat. Nos. 5,202,361; 5,262,216; 5,284,688; 5,385,772 ; 5,874,143, disclose examples of suitable pressure sensitive adhesives that can utilized in the laminate label. The pressure sensitive adhesive can be applied to the laminate label using well known techniques, such as shown in U.S. Pat. No. 5,861,201, the complete disclosure of which is incorporated herein by reference.

Examples of suitable polyolefin containers include, but are not limited to, beverage or water containers, pharmaceutical containers, and food containers. Intravenous bags, polyolefin wraps, and bottles are also examples suitable polyolefin containers. The polyolefin container can be formed from any of the polyolefin materials described herein.

Flexible Laminate Packaging Material

Multilayer packages may be formed by co-extrusion or by using an adhesive to bond the layers together. When printed material is inserted between layers, usually the layers cannot be formed by co-extrusion and an adhesive, such as a radiation-curable adhesive, must be used to the bond the layers together. Other considerations for using a radiation-curable adhesive instead of co-extrusion include high speed processing, energy savings, and equipment reductions. The radiation-curable, adhesive composition described herein is suitable for use in forming radiation-cured, flexible laminate packaging materials (hereinafter "flexible laminate packaging materials").

Figure 3:
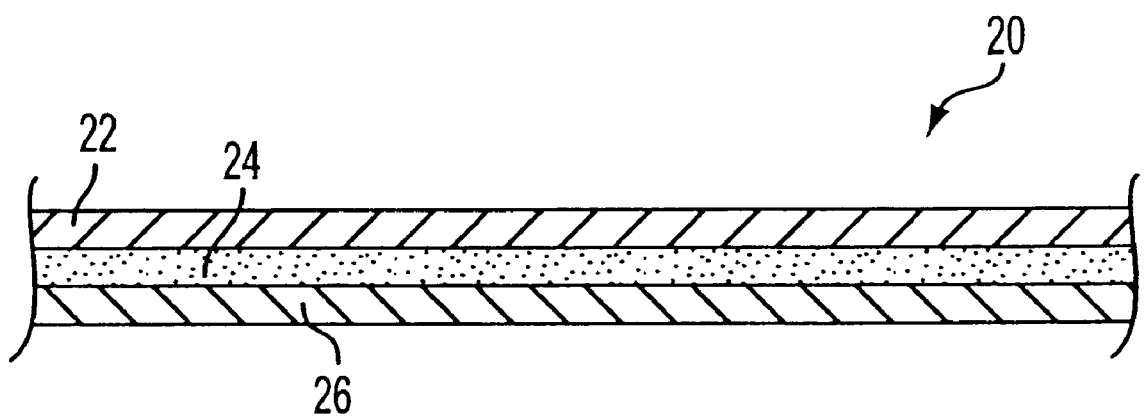
FIG. 3 illustrates a side, cross-sectional view of a radiation-cured, flexible laminate packaging material.

As shown in FIG. 3, the flexible laminate packaging material 20 includes at least one first layer 22 laminated to a polyolefin layer 26 by a radiation-cured, adhesive 24. The flexible laminate packaging material 20 can also include other layers as desired. Examples of suitable materials for the first layer 22 and other optional layers include, but are not limited to, paper, metalized films, co-extruded films, polyester films, and white polypropylene films.

The low-migration, radiation-curable adhesive composition described herein can be used to provide an improved flexible laminate packaging material in which the problem of contamination from migrating monomers is substantially reduced. The radiation-curable, adhesive composition described herein can be cured in the same manner as described above in reference to the laminate label.

At least one of the first layer 22 or the polyolefin layer 26 is preferably substantially clear to facilitate UV curing. Suitable substantially clear films can be formed from materials similar to those described in reference to the protective layer 2 described herein. The polyolefin layer 26 can be formed from any of the polyolefin materials described herein. U.S. Pat. No. 5,399,396 discloses examples of suitable layers for use in flexible, laminate packaging material, which are incorporated herein by reference. Neither the first layer 22 or the polyolefin layer 26 need to be substantially clear if EB curing is to be used. If desire, the clear layer can be the innermost layer for printed material readable from the inside surface of bag.

Another example of flexible laminate packaging material includes an outside clear layer which has been reverse printed on inside surface thereof bonded to a clear polyolefin using the radiation-curable, adhesive composition. A further example of a flexible laminate packaging material includes a clear layer bonded to a white polyolefin layer having printed material on an outside surface thereof bonded together using the radiation-curable, adhesive composition.

The improved flexible laminate packaging material can be used to contain beverages, pharmaceuticals, medical and dental devices, and food products. Preferred examples are snack food packaging and fruit juice containers.

The invention will now be further described with reference to the following non-limiting Examples and Comparative Examples.

EXAMPLE 1

An improved radiation-curable, adhesive composition was formulated as follows:

- 92.85 wt. % 1,2-Ethanedicarboxylic acid Mono [2-[(1 oxo-2-propehyl)oxy] Ethyl Ester;
- 5.0 wt. % 1,2-Benzenedicarboxylic acid Mono [2-[(1 oxo-2-propehyl)oxy] Ethyl Ester;
- 0.1 wt. % Fluoroalkylpolyester;
- 2.0 wt. % Oligo [2-hydroxy-2-methyl-1-[4(1-methyl-vinyl)phenyl]propanone]; and
- 0.05 wt. % 2,2'-(2,5-thiophenediyl)bis[5-tert-butylbenzoxazole]. All wt. % are based on the total weight of the radiation-curable composition.

Laminate labels were formed using a flexographic printing press running at speeds up to 300 ft/min. A 300 line/inch anilox roll was used to apply the radiation-curable laminating adhesive to one surface of a pressure sensitive label stock, Fasson 55 pound face paper, which was coated on the opposing surface with DL50 adhesive. Clear 0.5 mil corona treated OPP film was nipped to the wet radiation-curable laminating adhesive. The radiation-curable adhesive was cured by exposure to UV light from a 400 w/in. medium pressure mercury arc lamp. The labels were dye cut in line to a size appropriate to labeling one-gallon high density polyethlyene (HDPE) containers of drinking water.

Four labels were bonded on a one-gallon HDPE container of drinking water. The labeled container was stored at 130° F. for 20 days. The water was then analyzed by gas chromatography and mass spectroscopy (GC-MS) upon desorption from a C18 column. The analysis has a detection limit has about 1 part per billion. No components from the radiation-curable adhesive were detected in the water under these condition.

EXAMPLE 2

2.08 grams of the uncured low-migration, radiation-curable adhesive composition according to Example 1 was spread directly onto the pressure sensitive adhesive of three labels. This was about 250 times more uncured radiation-curable adhesive compared to normal labels. The labels were applied to a one-gallon HDPE container of water and aged at 130° F. for 10 days. The analysis detected only 11 parts per billion of acrylate monomer in the water in spite of the unusually high loading of uncured adhesive.

Comparative Example A

A commercially available radiation-curable adhesive composition containing 1,6-hexanediol diacrylate monomer (12000LA from Northwest Coatings Corp.) was used to prepare labels by the same method as described in Example 1. Three labels were applied to one-gallon HDPE container of water and then aged at 130° F. for 10 days. The water was tested in the same manner as in Example 1. 1,6hexanediol diacrylate was detected in the water at a level of 102 parts per billion.

Comparative Example B

A commercially available radiation-curable adhesive containing dipropylene glycol diacrylate monomer (15135LA from Northwest Coatings Corp.) was used to prepare labels by the same method as described in Example 1. Three labels were applied to one-gallon HDPE container of water and then aged at 130° F. for 10 days. The water was tested in the same manner as in Example 1. Dipropylene glycol diacrylate monomer was detected in the water at a level of 9 parts per billion.

The test results demonstrate that the improved radiation-curable adhesive composition is capable of providing a laminate label which substantially reduces the risk of contaminating the contents of a polyolefin container with uncured monomer.

While the claimed invention has been described in detail and with reference to specific embodiments thereof, it will be apparent to one of ordinary skill in the art that various changes and modifications can be made to the claimed invention without departing from the spirit and scope thereof.

What is claimed is:

1. A labeled plastic container suitable for containing a pharmaceutical or food grade product comprising:
    a walled structure comprising a polyolefin material defining an interior space suitable for containing a liquid or solid food product or pharmaceutical product; and
    a laminate label bound to an outer surface of said walled structure, wherein said laminate label comprises;
        a substantially clear or translucent protective polymeric film bound to a face stock by a radiation-cured composition formulated from a low-migration, radiation-curable adhesive composition comprising at least 50% of one or more radiation-curable, carboxylic acid functional monomers, wherein said face stock comprises at least one selected from the group consisting of paper, synthetic material that adsorbes radiation-curable monomers and inhibits radiation-curing of the adsorbed radiation-curable monomers, and combinations thereof, and wherein said laminate lable has been formed by ultraviolet light curing for said low-migration, radiation-curable adhesive composition through said substantially clear polymeric film.

2. A plastic container according to claim 1, wherein said laminate is bound to said outer surface of said walled structure using a pressure sensitive adhesive.

3. A plastic container according to claim 1, wherein less than 10 parts per billion of radiation-curable monomers from said radiation-curable adhesive composition migrates into said interior space when aged at 130° F. for 10 days.

4. A plastic container according to claim 1, wherein said face stock comprises paper.

5. A plastic container according to claim 1, wherein said face stock comprises a synthetic material capable of adsorbing radiation-curable monomers and inhibiting radiation-curing of the adsorbed radiation-curable monomers.

6. A plastic container according to claim 1, wherein said laminate label is bound to an outer surface of said container by a pressure sensitive adhesive.

7. A plastic container according to claim 1, wherein said low-migration, radiation-curable adhesive composition comprises at least 80% of said one or more radiation-curable, carboxylic acid functional monomers.

8. A plastic container according to claim 1, wherein said low-migration, radiation-curable adhesive composition comprises at least 90% of said one or more radiation-curable, carboxylic acid functional monomers.

9. A plastic container according to claim 1, wherein said low-migration, radiation-curable adhesive composition is substantially free of non-carboxylic acid functional monomers.

10. A plastic container according to claim 1, wherein said radiation-curable, carboxylic acid functional monomer comprises an acrylate functional group.

11. A plastic container according to claim 1, wherein said radiation-curable, carboxylic acid functional monomer comprises a methacrylate functional group.

12. A plastic container according to claim 1, wherein said radiation-curable, carboxylic acid functional monomer comprises the half ester of a hydroxy (meth)acrylate compound and an anhydride.

13. A plastic container according to claim 12, wherein said anhydride is selected from the group consisting of phthalic anhydride; isophthalic anhydride; terephthalic anhydride; trimellitic anhydride; tetrahydrophthalic anhydride; hexahydrophthalic anhydride; tetrachlorophthalic anhydride; adipic anhydride; azelaic anhydride; sebacic anhydride; succinic anhydride; glutaric anhydride; malonic anhydride; pimelic anhydride; suberic anhydride; 2,2-dimethylsuccinic anhydride; 3,3-dimethylglutaric anhydride; 2,2-dimethylglutaric anhydride; dodecenylsuccinic anhydride; nadic methyl anhydride; and HET anhydride and said hydroxy (meth)acrylate compound is selected from the group consisting of 2-hydroxyethyl (meth)acrylate; 2-hydroxypropyl (meth)acrylate; 2-hydroxybutyl (meth) acrylate; 2-hydroxy 3-phenyloxypropyl (meth)acrylate; 1,4-butanediol mono(meth)acrylate; 4-hydroxycyclohexyl (meth)acrylate; 1,6-hexanediol mono(meth)acrylate; neopentylglycol mono(meth)acrylate; trimethylolpropane di(meth)acrylate; trimethylolethane di(meth)acrylate; pentaerythritol tri(meth)acrylate; dipentaerythritol penta(meth) acrylate; and hydroxy functional (meth)acrylates represented by the following formula:

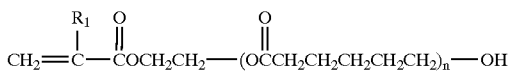

wherein R₁ is a hydrogen atom or a methyl group and n is an integer from 1 to 5.

14. A plastic container according to claim 12, wherein said anhydride comprises at least one of succinic anhydride or phthalic anhydride and said hydroxy (meth)acrylate comprises 2-hydroxyethylacrylate.

15. A plastic container according to claim 1, wherein said carboxylic acid monomer has a number average molecular weight of from about 100 to about 3000.

16. A plastic container according to claim 1, wherein said carboxylic acid monomer has a number average molecular weight of from about 150 to about 2000.

17. A plastic container according to claim 1, wherein said carboxylic acid monomer has a number average molecular weight of from about 200 to about 1500.

18. A plastic container according to claim 1, wherein said protective polymeric layer comprises at least one polymeric material selected from the group consisting of polyolefins, polyesters and polystyrenes.

19. A plastic container according to claim 1, wherein said protective polymeric layer comprises a polyolefin.

20. A plastic container according to claim 1, wherein said protective polymeric layer has a thickness of from about 0.2 mils to about 2 mils.

21. A plastic container according to claim 1, wherein said protective polymeric layer has a thickness of from about 0.4 mils to about 1.5 mils.

22. A plastic container according to claim 1, wherein said polyolefin comprises at least one selected from the group consisting of homopolymers or copolymers of ethylene, butylene, propylene, hexene, and octene, and coextruded films containing a polyolefin.

23. A plastic container according to claim 1, wherein said polyolefin comprises polypropylene.

24. A plastic container according to claim 1, wherein said low-migration, radiation-curable adhesive composition contains a polymeric photoinitiator.

* * * * *